United States Patent [19]

Stoll

[11] Patent Number: 4,637,433
[45] Date of Patent: Jan. 20, 1987

[54] SOLENOID VALVE

[76] Inventor: Kurt Stoll, Lenzhalde 72, 7300 Esslingen, Fed. Rep. of Germany

[21] Appl. No.: 814,003

[22] Filed: Dec. 19, 1985

Related U.S. Application Data

[63] Continuation of Ser. No. 663,438, Oct. 22, 1984, abandoned.

[30] Foreign Application Priority Data

Oct. 22, 1983 [DE] Fed. Rep. of Germany ....... 3338418

[51] Int. Cl.[4] ............................................. F16K 31/08
[52] U.S. Cl. ........................... 137/625.65; 137/625.67; 251/129.21; 251/129.22; 251/148
[58] Field of Search ...................... 251/129.21, 129.22, 251/148; 137/625.65, 454.6, 625.67, 580

[56] References Cited

U.S. PATENT DOCUMENTS

| 1,264,422 | 4/1918 | Moard | 91/465 X |
| 2,019,766 | 11/1935 | Peterson | 91/465 |
| 2,930,404 | 3/1960 | Kowalski et al. | 137/625.65 |
| 2,987,293 | 6/1961 | Knudson | 251/141 |
| 3,323,546 | 6/1967 | Lord | 285/190 X |
| 3,340,773 | 9/1967 | Franz | 91/465 |
| 3,341,169 | 9/1967 | Webb | 251/148 |
| 3,402,253 | 9/1968 | McCracken | 285/190 X |
| 3,529,620 | 9/1970 | Leiber | 251/129 X |
| 4,299,252 | 11/1981 | Reinickle | 251/139 X |

FOREIGN PATENT DOCUMENTS

| 645265 | 7/1962 | Canada | 251/141 |
| 2208218 | 8/1973 | Fed. Rep. of Germany | 137/625.65 |
| 7929196 | 10/1979 | Fed. Rep. of Germany. | |
| 3147030 | 6/1983 | Fed. Rep. of Germany. | |
| 10213 | of 1885 | United Kingdom | 285/190 |
| 107897 | 8/1967 | United Kingdom | 285/190 |
| 1217797 | 12/1970 | United Kingdom | 251/148 |
| 1324011 | 7/1973 | United Kingdom | 251/129 |

Primary Examiner—Larry Jones
Assistant Examiner—Carl D. Price
Attorney, Agent, or Firm—McGlew and Tuttle

[57] ABSTRACT

A solenoid valve has a valve body having a first driving fluid connection. On the valve body a rocking part is pivotally mounted which has a second driving fluid connection. In the valve body a valve cartridge is placed functioning as a 3/2 way valve controlling the flow path between the first and second fluid connections. The solenoid valve may be fitted with a venting muffler and chokes upstream and/or downstream therefrom.

12 Claims, 5 Drawing Figures

SOLENOID VALVE

This application is a continuation of application Ser. No. 663,438, filed Oct. 22, 1984, now abandoned.

BACKGROUND OF THE INVENTION

The present invention relates to solenoid valves.

A large number of different designs of solenoid valves have come into existence without however meeting all practical needs completely. As an example, 4/2 way solenoid valves are regularly used for controlling the supply of fluid under pressure to cylinder actuators. Such valves are as yet comparatively complex and their manufacture and assembly involve high costs. Such 4/2 way solenoid valves have a large overall size and because they are placed at some distance from the actuator cylinders, the connecting leads have a large volume. In the case of pneumatic systems there then has to be a powerful air supply means, this again being a factor which raises the price of the system. Furthermore such large lead volumes are likely to increase the response time and slow down the transmission of signals.

SUMMARY OF THE PRESENT INVENTION

One purpose of the present invention is to overcome these shortcomings of known systems.

A still further object of the invention is to create a simply assembled solenoid valve that may be very readily adapted to a given geometry of the existing connection features.

A still further objective of the invention is to make possible a degree of miniaturization that has so far not been attained, on the basis of which the valve may be made part and parcel of the connection unit of a pneumatic cylinder actuator.

Within the compass of a further aim of the invention is to design such a valve that makes possible a more compact connection form of the actuator cylinder and at the same time enhances the switching rate and positive switching action of the actuator.

In order to attain these and other objects of the invention, a solenoid valve comprises a valve body with a first fluid connection there on, a rocking member having a second fluid connection thereon, and a valve cartridge mounted within the valve body for controlling the flow of fluid between the first and second pressure connections. Further possible features of the invention will be seen from the claims.

A detailed account of the invention will now be given as based on the figures of the drawings.

DESCRIPTION OF THE PREFERRED EMBODIMENTS

Figure 1:
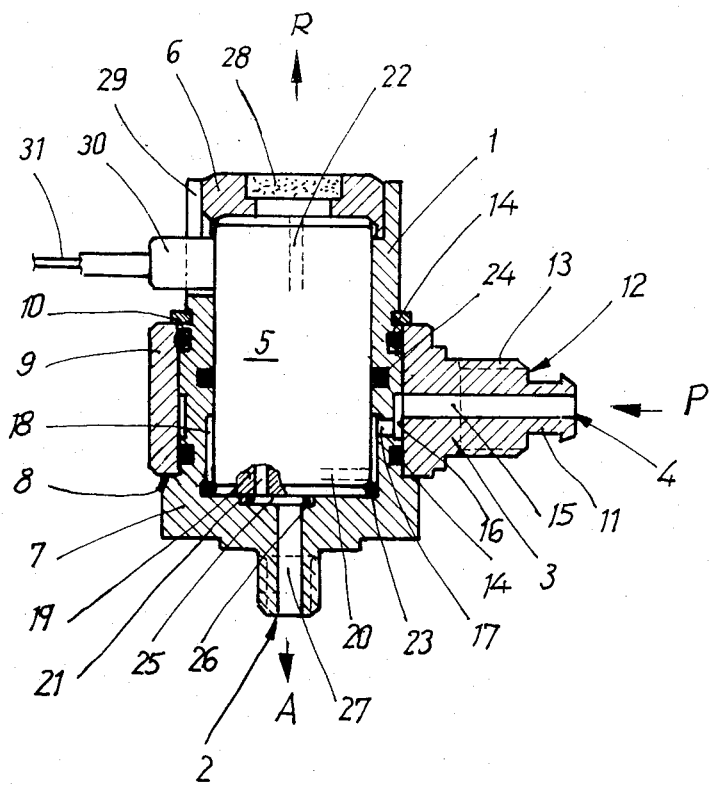
FIG. 1 is a lengthways section through a first working example of the invention in the form of a solenoid valve.

Referring first to FIG. 1, the reader will be able to see a 3/2 way solenoid or magnet-driven valve of the invention with a feed connection P, a power connection A and a vent port R. In a first switching state of the solenoid valve, the feed connection P is put in communication with the power connection A, whereas the vent port R is shut off. In a second switching condition of the solenoid valve, the connection between the feed connection P and the power connection A is interrupted and at the same time the power connection A is joined up with the venting port R. The solenoid valve has a valve body 1 with a first power pressure connection or terminal 2, which in the present example of the invention is the same as the power connection A. A rocking part or swivel member 3 is mounted on the valve body 1 so that it may turned thereon and it has a second pressure fluid connection 4, that in the form of FIG. 1 is the same as the pressure connection P. A modular solenoid valve unit in the form of a valve cartridge 5 is mounted within the valve body 1 for controlling the flow of fluid between the first, or power fluid pressure connection 2 and the second feed fluid connection 4. The cartridge is responsible for making possible the function of a 3/2 way valve.

The valve body 1 is generally in the form of a cylindrical bushing having an axial bore therein into which the valve cartridge 5 fits. The bushing is open at one end so that the valve cartridge may be inserted thereinto downwards from this end. After the valve cartridge 5 has been slipped into place, the port at the end of the body is shut off by a cover 6. At the other end of the bushing there is a floor 7, on which the valve cartridge, when put in place, stands upright. As a downwardly running tailpiece or axial extension, the bushing bears a connector on the floor 7 to form the power connection 2 of the valve body 1. The connector is screw threaded so that it may be screwed into a hole with a female screw thread in a hydraulic or pneumatic component with which it is to be joined. In this respect a useful effect is to be had, if a part of the bushing is adapted for use with a spanner, for example by having the form of a hex nut.

The floor 7 has a greater outer diameter than the rest of the bushing so as to form a ledge 8 or collar for supporting the rocking part 3.

This rocking part or swivel member 3 has a ring 9 fitting round the outer face of the cylindrical bushing. For assembly, the rocking part 3 and with its ring 9 are placed on the end of the bushing furthest from the connector of the valve body and moved downwards till the ring comes up against the shoulder 8. The rocking part 3 is locked in this position on the shoulder by a circlip 10, that is seated in a groove in the outer face of the bushing, such circlip 10 acting on the top end face of the ring 9 facing away from the shoulder 8. The rocking part 3 is in this manner kept in place between the shoulder 8 and the circlip 10 and may be turned through 360° round the bush. The ring 9 bears a radially directed, second connector molded thereon, that in the present example of the invention has the pressure or feed connection P thereon. The connector is designed for connection with flexible pipe and it tapers in steps towards its free end that takes the form of a flexible pipe connection bushing 11 with a conical head. When elastically opened out, a piece of flexible piping may be slipped onto this bushing 11 as far as the step 12, that marks the beginning of a threaded connector 13 with a larger diameter. A union nut may be screwed onto this threaded connector 13 so as to lock the flexible piping sealingly on the bushing 11.

To make a seal between the ring 9 of the rocking part 3 and the bushing of the valve body 1 there are two sealing rings 14 that are taken up in circumferential grooves in the outer face of the bushing and they each make contact with an end part of the ring 9. Upon mounting the rocking part 3 on the valve body 1, the sealing rings 14 are elastically deformed so that the necessary radial loading force needed for affording a sealing action is ensured. The sealing rings 14 make it possible for the rocking part 3 to be turned in relation to the bushing of the valve body and they will give a full sealing action in all the possible positions into which it may be swiveled. The sealing rings 14 may more specially be in the form of commercially available o-rings.

The connector of the rocking part 3 has a fluid duct 15 running through the ring 9 of the rocking part 3 and opening between the sealing rings 14 through the inner face of the ring 9. The fluid duct 15 runs into a circumferential groove 16 machined or otherwise produced in the outer face of the cylindrical bush. This circumferential groove 16 affords a fluid connection which is independent of the angle of the rocking part 3. It is in communication via a duct 17 with a groove 18 in the inner face of the bore of the valve body 1 into which the valve cartridge body 5 is fitted.

As has been indicated, the valve cartridge 5 has the function of a 3/2 way solenoid valve. It has a cylindrical housing 19, that possesses ports 20 for the pressure connection P, 21 for the power connection A and 22 for the venting connection R. In the fitted condition of the valve cartridge 5, the ports 20, 21 and 22 are sealed off from each other by means acting on the outer face of the cartridge so that it is only by way of the interior of the cartridge 5 that connections may be switched. The port 20 for the pressure connection P is located at the casing of the housing 19 quite near the end face, which is adjacent to the floor 7 of the valve body 1. This port 20 is in communication with the groove 18 in the inner face of the bushing bore receiving the valve cartridge 5. This groove 18 or widening represents a connecting duct between the cartridge and the bushing which is independent of the angle at which the cartridge is fitted in the bush of the valve body 1 so as to allow for certain inaccuracies in manufacture. A sealing ring 23 is placed in the groove 18 so as to be in contact with the floor 7 and with the chamfered edge of the valve cartridge 5 and there is a second sealing ring 24 located in a ring groove in the inner face of the bore so as to produce a seal between the cartridge 5 and the bush of the valve body 1. The port 20 for connection with the feed connection P is between the sealing rings 23 and 24 in the groove 18 so as to afford a fluid-tight connection with the duct 15, viz. without leakage into other parts of the clearance between the cartridge and the valve body.

The connection port of the valve cartridge 5 for the power duct A is located at the end face of the valve cartridge 5, that is adjacent to the floor 7. At the port 21 this floor 7 has a recess 25 with a circular cross section to take up a sealing ring 26. This sealing ring is loaded by the fitted valve cartridge 5 and it gives a sealing effect such that there is a fluid tight connection between the port 21 and duct 27 in the connector of the valve body 1 opening into the recess 25 and there is a duct connection with the power connection A.

The port of the valve cartridge 5 for the venting connection R is at the end face of the cartridge facing away from the connector on the floor 7. In the present form of the invention there is no separate sealing element here seeing that it is question only of letting off air into the atmosphere. Nevertheless, it would be possible to have a separate air venting duct (which is not shown). The end face of the cartridge 5 is contacted by a cover, which has a short skirt surrounding the top of the cartridge like a sleeve. The cover 6 is screwed into a thread at the free end of the bore of the body 1. It may be made with a slot (not marked) so that it may be turned with a screwdriver. The cover 6 has a counterbored hole through it in which a venting muffler 28, for example in the form of a fritted metal disk, is keyed in place.

The top end of the valve body 1 is axially slotted at 29 over the rocking part 3. The axial slot 29 is to let through an electrical connection 30 emerging from the casing of the valve cartridge. Wires 31 forming part of the electrical connection of the cartridge go to an electrical control and supply unit that is not shown.

The assembly of the solenoid of the invention is extremely simple: After fitting the sealing rings 14, the rocking part 3 is slipped onto the valve body 1 and locked in place thereon by the circlip 10. The complete, part-assembled valve cartridge 5 is inserted into the bore of the valve body, and lastly the cover 6 is screwed on so that the sealing rings 23 and 26 on the floor 7 of the valve housing are loaded and take effect.

Figure 2:
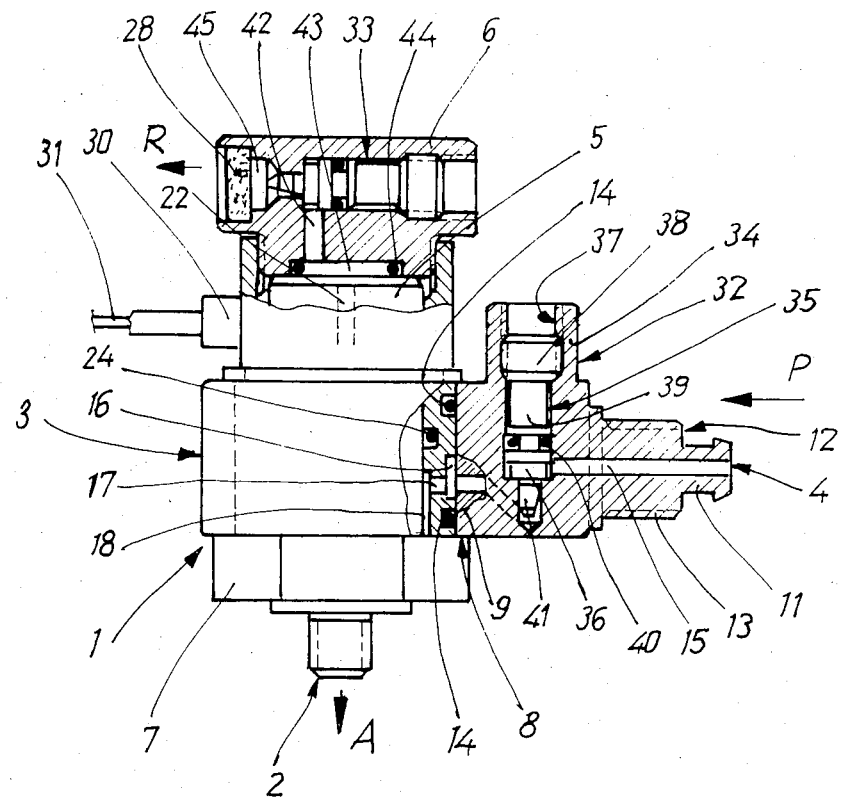
FIG. 2 is a view of a further valve akin to the valve of FIG. 1 but fitted with chokes.

On turning now to FIG. 2, the reader will see a further form of the solenoid valve in keeping with the present invention, which differs from the one so far described by the presence of two choke members 32 and 33 in addition. A first choke member 32 placed in the pressure or feed connection is borne by the rocking part 3 of the solenoid valve and a second one 33, functioning as a choke for the spent air venting from the valve, is mounted on the cover 6. The rocking part 3 and the cover 6 are suitably modified in their design to allow the addition of the chokes. However, the valve body 1 and the valve cartridge are the same as in the design of the invention to be seen in FIG. 1.

The rocking part 3 is formed with a head 34 running out upwards from its connector so as to be parallel to the main axis of the body. There is a valve bore 35 in the head 34 which houses a choke member 36 that is able to be accessed from the top end of the head. The valve bore 35 is multiply counterbored or shouldered and its portion with the largest diameter is screw-threaded at 37.

The lower end of this screw-threaded portion of the valve bore 35 merges with a conical shoulder whose lower end joins with a cylindrical bore portion with a medium diameter and which runs into the duct 15 within the pivoting or rocking part 3. This duct in turn runs into a hole with a smaller diameter. The lower end of this fine hole is joined with a duct 17 running as far as the inner face of the ring 9, at which position a fluid connection is produced with the valve cartridge 5 as in FIG. 1. The choke member 36 has a screw-threaded head 38 by which it is secured in place in the valve bore and positioned against the conical shoulder. The threaded head 38 has a stem part 39 running downwards from it and which has a circumferential groove in which a sealing ring 40 is positioned. At a point above the fluid duct 15 this ring makes sealing contact with the wall of the valve bore 35. The end of the choke member 36 is formed by a conical point or tip 41 that is fitted into the fine hole. Between the wall of the fine hole and the point 41 or tip there is then a ring-like gap whose size can be adjusted by screwing the choke member 36 inwards or outwards. The air or other operating fluid makes its way from the pressure connection P through the gap and is choked to an adjustable degree.

In order to economize on space, the other choke member 33 is placed in the cover 6 so as to be normal to the lengthways axis of the valve body, in other respects, however, its form is quite the same as the form of the choke member 32 in the pivoting part 3. The spent air to be choked gets to the choke member 33 via an axially running duct 42 in the cover 6. This axial duct 42 opens into a recess 43 on the underside of the cover 6, which is rested against the valve cartridge 5. The recess 43 has a circular cross section and its circumferential part is occupied by a sealing ring 44. The recess 43 is placed around a port 22 of the venting connection R at the end face of the valve cartridge 5 and a sealed off flow path to the choke member 33 is produced. At the downstream end of the choke member 33 there is a wider chamber 45 that is in communication with the outside atmosphere by way of a vent muffler 28. The air then escapes in the radial direction in terms of FIG. 2, whereas in the system of FIG. 1 the air is let off in the axial direction.

The components to be seen in FIGS. 1 and 2 are such that they may be utilized in other combinations and configurations than those shown. To take an example, a solenoid valve may be set up having a cover without any means choking the spent air, whereas the rocking part has a choke therein. By the same token, it is possible to combine a cover fitted with a choke with a rocking part not having a choke. The components of the solenoid valve are for this reason very flexible in the sense that they may be readily adapted to different applications.

Figure 3:
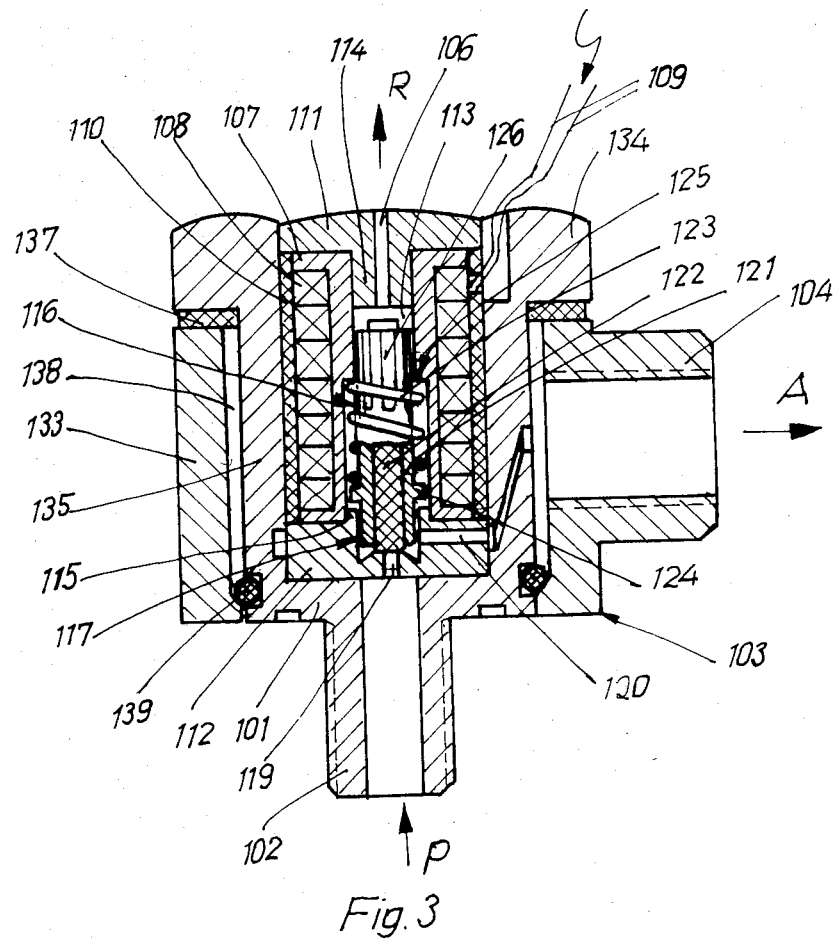
FIG. 3 is a section through a solenoid valve cartridge.

On referring to FIG. 3 it will be possible to see different designs of the solenoid valve of the instant invention. There will be seen to be a valve body 101 with an axially alined connector 102 and a rocking part 103 pivoted on the valve body 101 and having a second and radially projecting connector 104. The connector 102 of the valve body 101 is for the feed connection P and the rocking part 103 has the power connection A, that is in the form of a threaded bushing or male spigot element for fitting into a threaded female part.

The valve body 101 is outwardly flanged at its end remote from the connector 102. The outer edge of the flange 134 is preferably so shaped that it fits a tool and it may well have the form of a hexagonal nut so that a spanner may be used therewith. The ring 133 of the rocking part 103 surrounding the valve body 101 is smaller in diameter than the flange 134. On assembly it is slipped onto the end, remote from the flange 134, of the cylindrical bushing 135 of the valve body 101, the flange 134 arresting such motion of the ring 133 so that it is kept at a certain level on the body 101. Between the flange 134 and the top radial face of the ring 133 there is a sealing ring 137. The inner diameter of the ring 133 is for a large part of the axial extent greater than the outer diameter of the bush 135 so that between the bushing 135 and the ring 133 a ring-like or annular space 138 is left. The one end of this ring space 138 is sealed off fluid-tightly by the said sealing ring 137, that in the present example of the invention has the form of a flat packing ring. At the other end of the ring-like space 138 there is an o-ring 139. Same is accommodated in a circumferential groove in the bushing 135 in such a way that it proud of the outer face of the bush 135. Where it is contacted by this o-ring 139, the ring 133 has a rounded step, at which the diameter of the ring 133 decreases to a size slightly larger than the outer diameter of the bushing 135. The form of the inner face of the ring 133 is such as to lock onto the o-ring 139 and thus fix the ring 133 axially on the valve body. The o-ring 139 at the same time gives rise to an axial loading force to keep the rocking part 103 in sealing contact with the sealing ring 137.

The valve body 101 may have its connector 102 screwed into the housing of a component to which it is to be attached. In this assembled condition, the rocking part 103 is trapped between the housing and the flange 134 and locked axially. This is a specially simple way of locking the part 103 on the body 101 with no chance of its coming apart and being lost.

The valve body 101 furthermore has an axial middle bore 127 to take up the valve cartridge. The said cartridge is fitted into this bore 127 without any separate or specially designed sealing elements and the connections between the cartridge and the ports therefor in the body are ensured simply by the close fit of the cartridge in the bore. There is furthermore no separate cover for shutting off the bore 127; in fact, the valve cartridge comes to an end at the top flush with the top side of the flange 134 and a means for muffling the escaping, spent air is considered to be unnecessary. The port 119 of the cartridge adjoining the feed connection P and the port 120 thereof adjoining the power connection A are changed round so as to occupy swapped over positions in comparison with the positions of FIGS. 1 and 2. In other respects details regarding the connection ducts may be seen from the description hereinbefore.

The valve cartridge possesses a bobbin 107 with a magnet winding 108 thereon. The electrical leads of the winding are marked at 109. The bobbin 107 and the winding 108 are covered over on the outside radially by a sleeve 110. At its axial ends the valve cartridge is covered over by two covers 111 and 112. These covers 111 and 112 are shaped to fit into an axial bore 113 in the bobbin 107 so that they may be press fitted on the bobbin 107 and locked in place. It will be seen that there is a short stub 114 on the cover 111 which fits into the bore 113. On the other, opposite cover 112 there is a collar 115 fitting into the bore 113. The covers 111 and 112 cover over the end faces of the bobbin 107 and the end edge of the sleeve 110 and they come to an end flush with the outer face of the sleeve 110.

Between the covers 111 and 112 a valve member 116 is mounted in the valve bore 113 so that it may move axially. The covers 111 and 112 are designed as valve seats for the valve member 116 and they have the ports needed for the connection of the valve cartridge. The first cover 111 bearing the short stub 114 has a pressure venting duct 106 running centrally and axially through it and its short stub 114 so that it it comes to an end at the end face of the short stub 114 and opens into the valve bore 113. In this respect, the open end of the pressure escape duct 106 forms a valve seat for the valve member 116. The second cover positioned at the opposite, lower end of the bobbin 107 has the ports 119 and 120 for use with the pressure or feed connection P and the power connection A. As for details, its will be seen that the cover 112 has a recess 117 placed in the middle and along the axis, such recess 117 having a cylindrical cross section and being placed radially within the collar of the cover 112 projecting into the valve bore 113. The floor of the recess 117 is at a somewhat higher level in its middle part and more specially may be part-spherical or conical. The port 119 is placed in the arched middle part of the floor so as to make a connection with the pressure connection P. For the power connection A there is a port 120 in the form of a transverse radial duct running through the cover 112. The transverse duct leads from the recess 117 to the outer edge of the cover 12.

The valve member 116 is fitted in the valve bore 113 so that it may move axially therein between two positions in which it makes contact with the one or other cover 111 and 112. The valve member 116 has the form of a long pin with a round cross section. It is made up of a casing pipe 121 of a magnetic material and a sealing body 122 placed within the casing pipe 121. The sealing body 122 has its two ends projecting from the ends of the casing pipe 121 like buffers. In a shut position the valve member 116 is kept by a spring 123 against the arched top face of the second cover 112 with a loading effect. One end of the spring acts on a radial collar 124 formed on the casing pipe 121. The other end of the spring 123 rests against a shoulder 125 at which the valve bore 113 becomes smaller in diameter. Above the shoulder 125 or step the casing pipe 121 extends into the part of the valve bore with a smaller diameter for a certain length and makes guiding contact therewith. On the same lines, the other end of the casing pipe 121 runs into the recess 117 in the second cover 112 and is guided therein.

In its loaded resting position the valve member 116 is displaced axially out of the middle of the solenoid winding 108 downwards onto the cover 112. When the solenoid winding 108 is turned on, a force acts on the valve member 116, such force opposing the force of the spring 123 and lifting the valve member 116 clear of the top face of the cover 112. It is for this reason that the port 119 joined with the pressure or feed connection P is uncovered; at the same time the sealing body shuts off the pressure venting duct 106 in the top cover 111. If the supply of current to the solenoid winding 108 is now turned off, the valve member will go back into its resting position because of the returning force of the spring 123 acting thereon.

The valve member 116 is of such a size that it does not make sealing engagement with the inner face of the valve bore 113, viz. there is a clearance for the flow of fluid in the axial direction along the valve member 116 and between it and the bobbin. To this end there are a number of axial grooves 126 in the outer face of the casing pipe 121. They run from the end face of the valve member 116 as far as the point of contact with the helical compression spring 123, where the wider size of the valve bore gives an ample flow cross section. Grooves of the same sort 126 may be present on the other axial end of the valve member 116 as well and there is an advantage to be gained by having a number of recesses on the circumference of the collar 124 so that fluid under pressure is able to make its way round the same. The port 120 for the power connection A is in communication with the venting duct 106 in the resting position of the valve member 116 by way of the valve bore 113. If the solenoid winding 108 is turned on, a passage for the flow of the fluid is opened up between the pressure connection P and the power connection A, while at the same time the venting connection R is shut down.

The valve cartridge shown, which is to be treated only as an example of different possible designs, is completely assembled before being introduced into the valve body. For such assembly, the bobbin 107 with the solenoid winding 108 is slipped into the sleeve 110 with the leads 109 trailing therefrom. Then the valve member 116 with the spring 123 is put in the valve bore 113 and lastly the covers 111 and 112 are pushed home tensioning the spring 123 and moving the valve member. The covers 111 and 112 are kept by friction on the bobbin 107 in place and the complete assembly operation is simply one of plugging the different components together rather than by screwing.

The valve cartridge to be seen in FIGS. 1 and 2 may be the same as that used in FIG. 3 apart from obvious changes, and in other respects as well the features of the different designs are mutually exchangeable.

Figure 4:
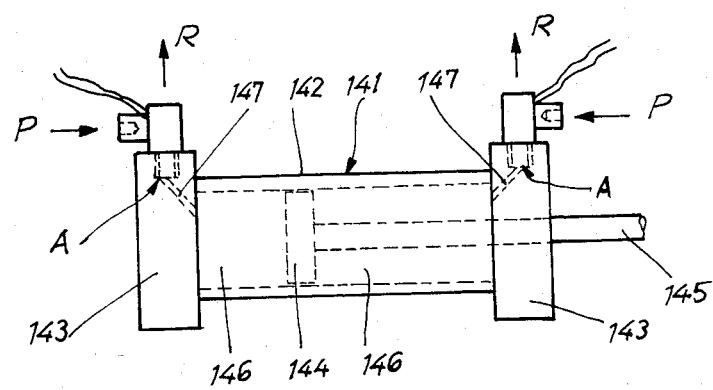
FIG. 4 is a view of an actuator system fitted with valves in keeping with the invention.

In FIG. 4 the reader will be able to see a working example of the solenoid valve of the present invention in which the valve body bears has the power connection A on it and the rocking part bears the feed connection P. Two such solenoid valves are used for controlling the operation of a cylinder actuator 141, that is made up of a cylinder barrel 142, two end plates 143 and a piston 144. A piston rod 145 runs through one of the end plates 143 and is joined with a load (not shown) to be driven. The piston 144 divides the cylinder barrel 142 into two working spaces 146 and the solenoid valves function to control the supply of fluid under pressure to each of such spaces. The bodies of the solenoid valves are to this end screwed into holes in the cylinder end plates 143, and they are in communication with the two working spaces by way of holes 147 through the end plates. The two solenoid valves are operated 180° out of phase so that the piston is moved backwards and forwards.

The solenoid valve in keeping with the invention makes possible a degree of miniaturization that has so far not been possible. Typically, the diameter of the valve cartridge will be under 1.5 cms and its length will be less than 3 cms. Such a valve cartridge may be integrated in connection units without substantially increasing the size thereof. The supply of fluid under pressure to a cylinder actuator 141 by way of two such solenoid valves makes possible a very compact construction. As compared with a conventional control set-up using a single 4/2 solenoid valve, the fluid leads are shorter and there is a reduction in the lead volume so that the speed Ind reliability of switching of uhe cylinder actuator will be increased. The solenoid valve of the invention is in addition characterized by a high degree of flexibility with respect to its connection leads.

Figure 5:
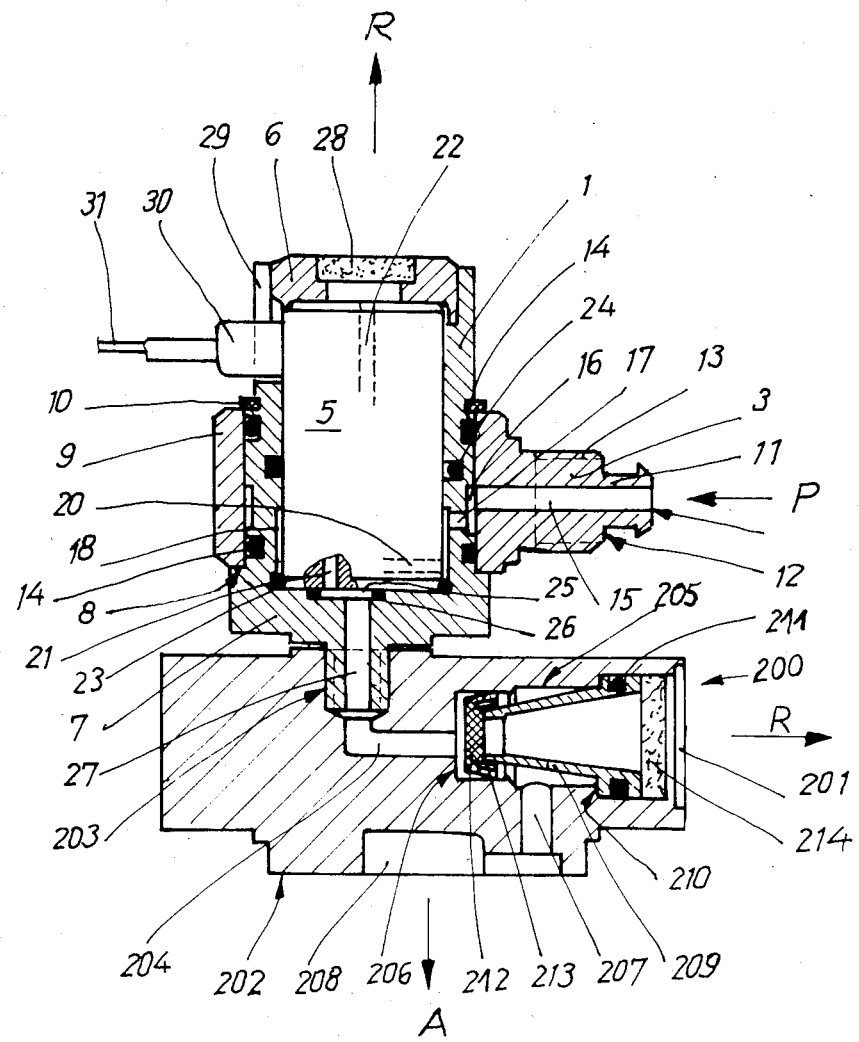
FIG. 5 is a section of a valve as in FIG. 1 but fitted with a high speed vent.

For fields of use in which large volumes of spent air are to be discharged, the solenoid valve of the invention may be usefully fitted with a high-speed discharge or venting valve 200 as will be seen in FIG. 5. The solenoid valve here is as shown in FIG. 1. It is simply presented as an example for all other possible forms of the invention. The high-speed escape valve is placed downstream from the solenoid valve, viz. between it and the load. It creates a flow path with a large cross section between the load driven by fluid under pressure and an additional discharge port 201.

The high-speed discharge valve 200 has a housing 202 with a screw threaded hole 203 into which the threaded connector 13 of the valve of the invention may be screwed. Upstream from the hole 203 there branches a duct 204 running to a hole 205 in the housing, such hole 205 having a port on the outer face of the housing to form the discharge part 201. The duct 204 runs through a shoulder 206 at the end of the bore 205 in the housing, into which a transverse duct 207 is ported and which is connected with a power connection 208 of the high-speed discharge valve 200.

Within the bore 205 of the housing there is a conical insert 209 that is fixed in place fluid-tightly, preferably by being locked against a shoulder 210 in the bore 205 and by the use of an o-ring 211. The insert 209 basically has the shape of a hollow frustum of a cone that is open at both ends. The end with the large cross section is turned towards the pressure discharge port 201 and the end with the smaller diameter projects into the bore 205 of the housing and is spaced somewhat from the port at the end of the duct 204. The outer face of the insert 209 is spaced from the port of the transverse duct 207. Therefore there is ring-like space between the insert 209 and the wall of the bore 205 in the housing to act as a passage for the flow of air under pressure.

The narrower end of the conical insert 209 forms a seat for a valve plate 212. This plate is able to be moved axially between the shoulder 206 of the bore 205 of the housing and the end face of the insert 209. It may be shifted between two alternative sealing positions such that in the one position it seals off the end of the conical insert 209 and in the other the duct 204. The valve plate 212 is guided by means of a ring-like lip 213 that makes sealing contact with the wall of the bore 205 in the housing. In keeping with a preferred form of the invention, the valve plate 212 is in the form of a cylindrical basic body, whose flat or end faces play the parts of sealing faces, and a bell-like flared ring-like lip 213, which preferably runs to the right from the flat face of the body of the plate that is turned towards the shoulder 206 of the bore 205 in the housing. The lip runs conically to the right past the flat face on the other side of the valve plate turned towards the conical insert 209. It is because of this form that the ring-like lip 213 is able to be lifted clear from the shoulder 205 under the effect of fluid under pressure entering via the duct 204. Because of this property, the following operation of the high-speed discharge valve 200 results:

When the valve in keeping with the invention opens, air under pressure moves through the duct 204 into the bore 205 of the housing so that the valve plate 212 is displaced towards the end face of the conical insert 209 and makes sealing contact therewith. At the same time the ring-like lip 213 is moved clear of the wall of the bore 205 under the effect of the moving fluid in the housing and pressed radially inwards. Therefore, the compressed air may flow past the insert 209 and and through the transverse duct 207 and thence into the power connection 208. If now the solenoid valve of the invention shuts, there is firstly an escape of air through the internal vent opening 22 and a consequent drop in pressure in the duct 204 as compared with the operational pressure obtaining in the power connection 208. The ring-like lip 213 is for this reason able to fan outwards and go back into its sealing position against the wall of the bore 205 in the housing. Then the pressure differential and the incipient return flow from the load forces the valve plate 212 from the end face of the insert 209 and it goes over into its other, alternative end position, in which it seals off the duct 204. At the same instant a flow path is opened up through the inside of the insert 209 to the additional pressure vent 201 of the high-speed venting or discharge valve 200, by dirt of which the air is quickly released from the load because of the continuous, large flow path now called into existence. To muffle noise, the pressure vent 201 is preferably plugged with a muffling filter 214, as for example in the form of a disk of metal frit.

The invention is not limited to the particular form of a high-speed discharge valve described herein. The solenoid valve of the invention may in fact be united with other forms of a high-speed discharge valve, it being possible for the housing to be made in one piece. A preferred application of the valve unit is for the operation of pressure cylinder actuators.

What is claimed is:

1. A solenoid valve comprising:

a valve body having an inner axially extending cylindrical bushing space and an outer axially extending cylindrical surface, said valve body having a floor for bounding a lower end of said cylindrical bushing space, said cylindrical bushing space being open at an end opposite from said floor, said valve body having a first threaded pressure connection extending axially from said floor defining a first fluid duct;

a swivel member rotatably mounted on said valve body, said swivel member having a ring portion slidably engaged over said outer cylindrical surface of said valve body and a second pressure connection extending radially from said ring portion with respect to said valve body, said second pressure connection having a second fluid duct therein, said valve body and said ring portion defining a first annular grooved passage therebetween communicating with said second fluid duct;

a valve cartridge having an outer cylindrical surface disposed in said axial cylindrical bushing space of said valve body, said valve body defining a second annular groove communicating with said axial cylindrical bushing space and engaged around said cylindrical outer surface of said valve cartridge, with a fluid connection passage in said valve body communicating with said first annular grooved passage and said second groove for establishing communication between said second fluid duct of said second pressure connection and said outer cylindrical surface of said valve cartridge, said valve cartridge having a first port extending axially into said cartridge and adjacent said first fluid duct for communication with said first fluid duct, said valve body valve cartridge having a second port extending radially into said outer cylindrical surface of said valve cartridge and communicating with said second annular groove of said valve body for establishing communication between said second fluid duct and said second port, said valve cartridge defining an axial valve body space therein communicating with said first and second ports, a valve member axially movable in said valve body space, a first valve seat defined in said valve cartridge through which said first port extends, said valve member having a sealing body for engagement against said first valve seat for closing off communication between said first and second ports, and said valve member being movable away from said first seat into a position for establishing communication between said first and second ports, said valve cartridge including a magnetic coil disposed around said valve body space and activatable for moving said valve member in an axially selected direction, and spring means engaged between an inner surface of said valve body space and said valve member for biasing said valve member in an opposite direction from said selected direction; and first cover means connected to said valve body for covering said axial cylindrical bushing space of said valve body, second cover means on said valve cartridge for covering said valve body space of said valve cartridge, said first cover means including a third fluid duct extending axially therein for establishing communication between said axial cylindrical bushing space and an exterior of said valve body, said second cover means having a fourth fluid duct for extending axially therein for establishing communication between said valve body space and said bushing space, said valve member in said position for establishing communication between said first and second port, closing off said fourth fluid duct;

said sealing body of said valve member extends axially through said valve member, said valve member comprising a ferromagnetic tube around said sealing member, said sealing member being engageable against said first valve seat, said second cover means defining a second valve seat communicating with said fourth fluid duct and said sealing member engagable against said second valve seat;

said first cover means comprising a valve body cover portion connected to said valve body and engaged over and against said valve cartridge, said swivel member including a first throttle valve space communicating with said second fluid duct and a first throttle member engaged in said first throttle valve space for regulating a flow of fluid into said second fluid duct, said valve body cover portion including a second throttle valve space with a second throttle valve member movable in said second throttle valve space, said second throttle valve space communicating with said third fluid duct with flow through said third fluid duct being regulatable by a position of said second throttle valve body.

2. A solenoid valve according to claim 1, where each of said first and second throttle valve bodies are threaded respectively into said first and second throttle valve spaces, each of said throttle valve spaces including a reduced diameter needle space forming a portion of said second and third fluid ducts respectively, said first and second throttle valve bodies each having a needle portion movable by a selected amount into said respective needle space.

3. A solenoid valve according to claim 2, wherein said valve body cover is threaded to said valve body to close said open end of said axial cylindrical bushing space of said valve body, said second throttle valve space and second throttle valve body extending radially in said valve body cover.

4. A solenoid valve according to claim 1, wherein said second throttle valve space and second throttle valve body extends radially in said valve body cover.

5. A solenoid valve comprising:

a valve body having an inner axially extending cylindrical bushing space and an outer axially extending cylindrical surface, said valve body having a floor for bounding a lower end of said cylindrical bushing space, said cylindrical bushing space being open at an end opposite from said floor, said valve body having a first threaded pressure connection extending axially from said floor defining a first fluid duct;

a swivel member rotatably mounted on said valve body, said swivel member having a ring portion slidably engaged over said outer cylindrical surface of said valve body and a second pressure connection extending radially from said ring portion with respect to said valve body, said second pressure connection having a second fluid duct therein, said valve body and said ring portion defining a first annular grooved passage therebetween communicating with said second fluid duct;

a valve cartridge having an outer cylindrical surface disposed in said axial cylindrical bushing space of said valve body, said valve body having a fluid connection for establishing communication between said first annular grooved passage and said outer cylindrical surface of said valve cartridge, said valve cartridge having a first port for communication with said first fluid duct, and a second port for establishing communication with said fluid connection, said valve cartridge defining a valve body space therein communicating with said first and second ports, a valve member movable in said valve body space for closing off communication between said first and second ports and for establishing communication between said first and second ports, and magnetic means for moving said valve member; and cover means connected to said valve body for covering said axial cylindrical bushing space of said valve body, said cover means including a third fluid duct extending axially therein communicating with a fourth fluid duct in said cartridge, both said third fluid duct and said fourth fluid duct establishing communication between said valve body space and an exterior of said valve body, said valve member while moved for establishing communication between said first and second ports, also arranged for closing off communication to said fourth fluid duct in said cartridge;

said swivel member including a first throttle valve space communicating with said second fluid duct and a first throttle member engaged in said first throttle valve space for regulating a flow of fluid into said second fluid duct, said cover means including a second throttle valve space with a second throttle valve member movable in said second throttle valve space, said second throttle valve space communicating with said third fluid duct with flow through said third fluid duct being regulatable by a position of said second throttle valve body.

6. A solenoid valve, according to claim 5, wherein said valve member has a sealing body extending axially through said valve member, said valve member comprising a ferromagnetic tube around said sealing body, said sealing member being engageable against a first valve seat in said valve cartridge, said cover means defining another valve seat communicating with said fourth fluid duct and said sealing member engageable against said valve seat.

7. A solenoid valve, according to claim 6, including a valve cartridge cover connected to said valve cartridge for closing said valve body space in said valve cartridge, said fourth fluid duct being in said valve cartridge cover and comprising a third port for said valve cartridge, said valve cartridge comprising a sleeve carrying said magnetic means on an exterior thereof and defining said valve body space on an interior thereof, said valve cartridge cover having an axial projection through which said third port extends, which projection being press-fit to and extending into said valve body space, and a second cover having an axial projection press-fit into an opposite end of said valve body space for closing said valve body space.

8. A solenoid valve according to claim 6, including seal ring means engaged between said valve body and an exterior portion of said valve cartridge in said axial cylindrical bushing space for isolating said first, second and third ports of said valve cartridge from each other.

9. A solenoid valve according to claim 8, wherein said sealing ring means includes a sealing ring engaged between said valve cartridge and said valve body around said first port and around said first fluid duct for at least partly supporting said valve cartridge in said cylindrical bushing space.

10. A solenoid valve according to claim 6, including a sound damper engaged across said third fluid duct, said first fluid duct comprising a fluid-power duct, said second fluid duct comprising a fluid supply duct and said third fluid duct comprising an exhaust duct.

11. A solenoid valve according to claim 6, wherein said valve body includes a large diameter portion on one side of said outer cylindrical space of said valve body and defining a radial shoulder, said swivel member engaged against said radial shoulder and a split ring engaged on said valve body on an opposite side of said outer cylindrical surface of said valve body for holding said swivel member against said radial shoulder.

12. A solenoid valve according to claim 6, including a pair of axially spaced O-rings engaged between an interior of said ring portion of said swivel member and said outer cylindrical surface of said valve body, said O-rings sealing said first annular grooved passage therebetween and providing a frictional engagement for rotation of said swivel member on said valve body.

* * * * *